Victor G. Klein,
Paul Walls,
Inventors.
Koenig and Pope,
Attorneys.

Nov. 10, 1953   V. G. KLEIN ET AL   2,658,585
LUBRICATING APPARATUS

Filed July 27, 1951   3 Sheets-Sheet 2

Victor G. Klein,
Paul Walls,
Inventors.
Koenig and Pope,
Attorneys.

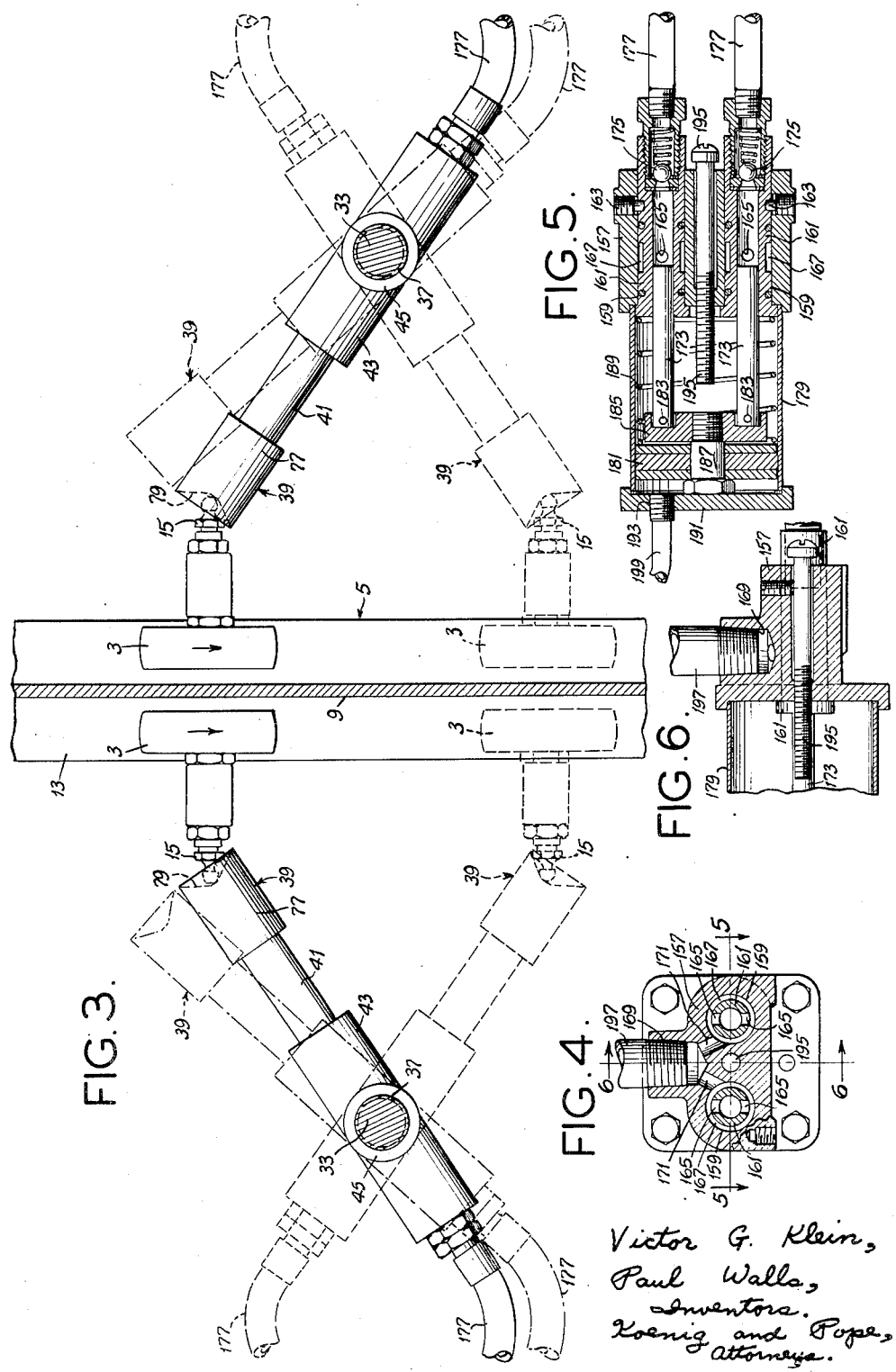

Patented Nov. 10, 1953

2,658,585

UNITED STATES PATENT OFFICE 2,658,585

LUBRICATING APPARATUS

Victor G. Klein, Defiance, and Paul Walls, St. Louis, Mo., assignors to Lincoln Engineering Company, St. Louis, Mo., a corporation of Missouri Application July 27, 1951, Serial No. 238,894

3 Claims. (Cl. 184—15)

This invention relates to lubricating apparatus, and more particularly to apparatus for lubricating overhead conveyors.

The principal object of the invention is the provision of improved lubricating apparatus for an overhead conveyor of the type having rollers travelling on an overhead support, such as a monorail conveyor, adapted automatically to lubricate the bearings of the rollers in the course of their travel on the overhead support. It will be understood, however, that the principles of the invention are applicable in general to the lubrication of apparatus other than overhead conveyors of similar nature to the extent of having a movable element or elements requiring lubrication.

In general, the invention is applicable to the lubrication of any element or series of elements movable in a predetermined path, and involves the provision of a lubricant-receiving fitting on such an element. A lubricant-delivery coupler having a discharge end for application to the fitting is movably mounted adjacent the path in which the element travels, with its discharge end positioned for engagement with the fitting as the fitting travels with the element through a portion of its path. A fluid pressure controlled stop determines an initial active position of the coupler. Fluid pressure operated means is provided for injecting lubricant through the lubricant-delivery coupler to the fitting during the interval in which the coupler and fitting are in engagement. This means and the stop are adapted for connection in a fluid pressure system. As long as there is pressure in the system, the stop remains in a position determining the initial active position of the coupler. When the pressure is cut off, the stop is released to allow the coupler to move to an inactive position. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a plan of lubricating apparatus constructed in accordance with the invention with parts broken away and shown in section, certain swinging lubricant-delivery couplers being shown in an initial angular position;

Fig. 2 is a front elevation of Fig. 1 with parts broken away and shown in section, and illustrating the lubricant-delivery couplers swung forward to a position in the plane of the sheet;

Fig. 3 is a horizontal section taken on line 3—3 of Fig. 2, illustrating in solid lines the lubricant-delivery couplers in the said initial angular position, illustrating in dotted lines the couplers in their most forward advanced position, and illustrating in dot-dash lines the couplers in an inactive position rearward of their initial angular position;

Fig. 4 is a vertical section taken on line 4—4 of Fig. 1;

Fig. 5 is a horizontal section taken on line 5—5 of Fig. 4;

Fig. 6 is a fragmentary vertical section taken on line 6—6 of Fig. 1 and Fig. 4; and, Fig. 7 is an enlarged vertical section taken on line 7—7 of Fig. 1, illustrating parts in a different position from the position shown in Fig. 1.

Similar reference characters indicate corresponding parts throughout the several views of the drawings.

Figure 1:
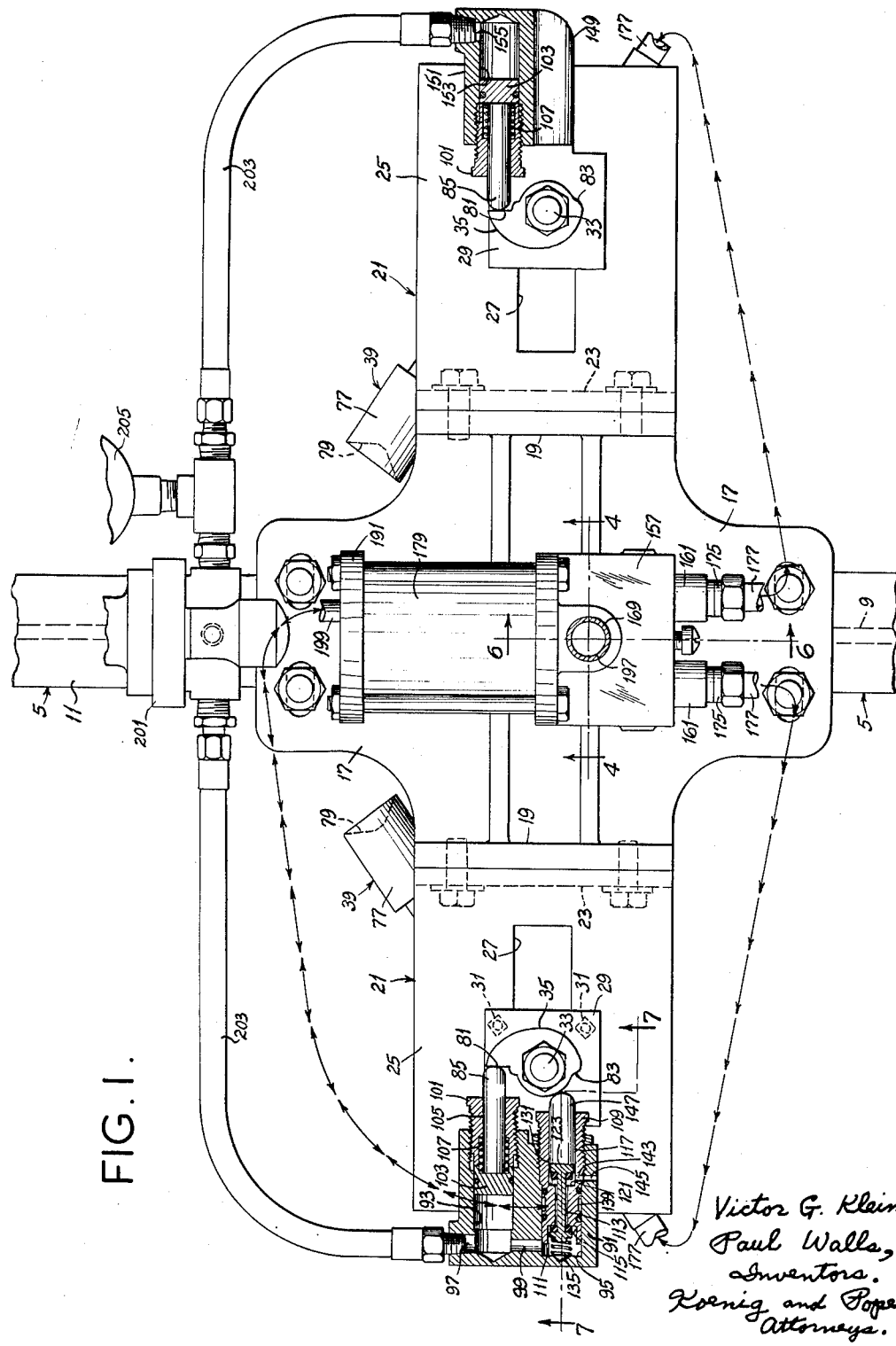

Referring to the drawings, the invention is illustrated in one of various possible specific embodiments as applied to lubricating the rollers of an overhead endless conveyor of the monorail type. Such a conveyor comprises a series of hangers 1 having rollers 3 riding on an overhead support 5. The hangers are connected together in series as by an endless chain (not shown). The support 5, as shown, is an I-beam having a web 9 and upper and lower flanges 11 and 13. Each hanger has a pair of axially aligned rollers riding on the lower flange 13 of the I-beam, the two rollers being on opposite sides of the web. The rollers are journalled on a horizontal axis at the upper end of the hanger, the latter hanging down below the beam. Such conveyors are well known, and further description thereof is not believed necessary. In accordance with this invention, for each roller there is provided a lubricant-receiving fitting 15, of the type such as shown for example in U. S. Patent 2,400,817. The fitting 15 for each roller projects axially outward. It will be understood that the fitting is of a type adapted for application to its end of a lubricant-delivery coupler for injection of lubricant through the fitting to the journal or bearing of the respective roller 3.

Fastened on the upper flange 11 of the I-beam 5 at any suitable location along its length, preferably on a straight run of the beam, is a supporting plate 17. This has vertical side flanges 19 extending parallel to the beam on opposite sides thereof. Fastened to each side flange is an angle bracket 21. As shown, each angle bracket has a vertical leg 23 fastened to the flange 19, and a leg 25 which extends horizontally and laterally outward from the top of the vertical leg. In the horizontal leg of each bracket 21 is an elongate slot 27 extending transversely to the length of the I-beam. A block 29 is slidable lengthwise in the slot of each bracket, being held in adjusted position by set screws 31. A shaft 33 is journalled in each block 29 for rotation on a vertical axis. Fixed on each shaft above the block is a cam 35, to be more particularly described later. The cam holds the shaft in the block. Below the block, each shaft has a threaded section 37.

Each shaft 33 carries a push-contact type of lubricant-delivery coupler generally designated 39 having a discharge end for application to each of the fittings 15. The two couplers 39 are identical, and are swingable in arcs in the horizontal plane of the path of the fittings. The coupler on one side of the I-beam is for delivering lubricant to the fittings of the conveyor rollers on that side of the beam, and the other coupler on the other side of the beam is for delivering lubricant to the fittings of the conveyor rollers on the other side of the beam. Each coupler 39 comprises a tubular plunger 41 which is telescopically slidable transversely to the axis of its respective shaft 33 in a cylinder or sleeve 43 having a vertical socket 45 adjustably threaded on the threaded lower section 37 of the shaft 33. Each plunger 41 has a reduced-diameter extension 47 which extends slidably through an opening 49 of corresponding diameter in an integral head 51 at one end of the sleeve 43. A compression spring 53 surrounding the extension within the sleeve reacts from the head 51 against the shoulder 55 at the extension end of the plunger 41 to bias the plunger in outward direction as regards the sleeve 43. The outward movement of the plunger under the bias of the spring 53 is limited by a stop nut 57 adjustably threaded on the outer end of the extension 47.

The extension and plunger have a bore 59 serving as a passage for lubricant. The outer and discharge end of the plunger 41 has a counterbore 61 at the inner end of which is a valve seat 62 for a check valve ball 63. The ball 63 is biased against the seat by a valve spring 65 reacting from a fitting 67 threaded in the outer end of the counterbore. The fitting 67 has a bore 69 forming a continuation of the bore or passage 59 in the plunger, with a counterbore 71 at the outer end of the bore 69. Seated in this counterbore 71 is a packing 73 having a central passage 75 forming a continuation of the bore 69. The packing is retained in the counterbore 71 by a member 77 threaded on the outer end of the plunger 41 having an outwardly divergent conical opening 79. The inner and smaller end of this conical opening is smaller than the outside diameter of the packing 73 but larger than the passage or opening in the packing, thereby to hold the packing in the counterbore 71 while exposing an annular area of the packing around its central opening for sealingly engaging the end of a lubricant fitting 15.

The two cams 35 are identical. Each has a shoulder 81 and a rise 83. The shoulder 81 of each cam is engageable with a stop 85 determining an initial angular position of the lubricant-delivery couplers 39 illustrated in Fig. 1 and in solid lines in Fig. 3. In this position of the couplers, they are both angled rearward in respect to the direction of forward movement of the rollers 3, this direction of movement being indicated by the arrows in Fig. 3. As herein illustrated, in their initial position, the couplers are angled about 37° rearward of a position perpendicular to the direction of length of the I-beam (the path of travel of the rollers 3). Each plunger is biased to its aforesaid initial angular position by a torsion spring 87 which surrounds the respective shaft 33 under the block 29 and has its upper end held to the block and its lower end held to the shaft. When a plunger is in its initial angular position, it is extended by its spring 53 to a position of maximum radius from its axis to its discharge end at member 77, and its discharge end is located for engagement by fittings 15 on the rollers 3 travelling toward the lubricant-delivery couplers in the manner shown in Fig. 3. As illustrated in Fig. 1, the left hand shaft 33 and the cam 35 thereon are biased to rotate counterclockwise by the respective torsion spring, and the right hand shaft 33 and cam 35 thereon are biased clockwise.

One of the bearing blocks 29, namely the left-hand block as illustrated in Figs. 1 and 2, has an integral bracket 89 carrying a cylinder block 91 laterally outward of the respective cam 35. The cylinder block 91 has two cylinders 93 and 95 therein. These are positioned with their axes at right angles to the I-beam 5 and are located side-by-side. The cylinder 93 is in the line of action of the shoulder 81 of the cam 35, and the cylinder 95 is in the line of action of the rise 83 of the cam. Each cylinder is open at its end towards the cam and closed at its end away from the cam. The cylinder block 91 has an air inlet port 97 which leads into the cylinder 93 adjacent its closed end, and a port 99 which leads from the cylinder 93 to the cylinder 95 adjacent their closed ends. A head 101 is threaded in the open end of the cylinder 93 toward the cam 35. A piston 103 is slidable in the cylinder 93. The stop 85 consists of a rod or plunger which extends through a bore 105 in the head 101, being slidable in this bore 105. The piston 103 is biased inward toward the closed end of the cylinder 93 by a spring 107. When air under pressure is applied to the cylinder 93 through the inlet port 97, the stop 85 is held outward in the extended position illustrated in Fig. 1 against the bias of the spring 107. Engagement of the shoulder 81 on the cam 35 with the end of the stop 85 when the latter is in its extended position determines the initial angular position of the lubricant-delivery coupler 39 illustrated in Fig. 1 and in solid lines in Fig. 3.

In the cylinder 95 is an air valve operated by the left-hand cam 35. As shown in Figs. 1 and 7, this valve comprises a cylindrical valve seat body 109 threaded in the cylinder 95 with its inner end spaced from the closed end of the cylinder to provide a space 111. The port 99 opens into this space. The body 109 has an axial bore 113, a relatively short counterbore 115 at its inner end, and a relatively long counterbore 117 toward its outer end. The shoulders at the ends of the short and long counterbores serve as valve seats 119 and 121, respectively. A valve member generally designated 123 has a stem 125 slidable in the bore 113, with a sufficiently loose fit to allow for the passage of air in the space between the stem and the internal wall of the body 109 in the bore 113. On the end of the stem in the short counterbore 115 is a hexagonal valve head 127 having a packing 129 facing the valve seat 119 for sealing engagement therewith. On the end of the stem 125 in the long counterbore 117 is a hexagonal valve head 131 having a packing 133 facing the valve seat 121 for sealing engagement therewith. The valve heads 127 and 131 are made hexagonal so that they have a sliding fit in their respective counterbores and also allow for passage of air through the counterbores.

The valve stem 125 of the valve member 123 is longer than the bore 113 so as to be axially slidable between an active position (Fig. 7) wherein the valve head 131 blocks the right end of the bore or passage 113 and wherein the left end of the bore 113 is open, and an inactive position (Fig. 1) wherein the valve head 127 blocks the left end of the bore 113 and the right end of the bore is open. The valve member is biased toward this inactive position by a spring 135 in space 111. The body 109 has a radial port 137 leading from the bore 113 to an annular peripheral groove 139, and the groove 139 opens into an air outlet port 141 in the cylinder block 91. The body 109 has a vent 143 (Fig. 1) from the counterbore 117 adjacent the valve seat 121 which opens into a vent hole 145 in the cylinder block 91.

The valve member 123 is actuated by the cam 35 through a cam follower rod 147 which is slidable in the counterbore 117. The development and phasing of the cam 35 is such that when the cam is in its position corresponding to the initial angular position of the left-hand lubricant-delivery coupler 39 (Fig. 1), in which position the shoulder 81 is in engagement with the extended stop 85, the valve member 123 is held in its inactive position (Fig. 1) by the spring 135. When the left-hand lubricant-delivery coupler 39 and cam 35 rotate clockwise as viewed in Fig. 1 from the initial angular position, the rise 83 of the cam 35 drives the follower 147 to the left as viewed in Figs. 1 and 7, thereby driving the valve member 123 to its active position (Fig. 7). This action occurs when the lubricant-delivery coupler reaches a position about 5° rearward of its position perpendicular to the length of the I-beam. When the valve is in its inactive position (Fig. 1), wherein the valve head 127 blocks the left end of the bore 113, air under pressure is retained in the space 111. Also, the air outlet port 141 is in communication with the atmosphere through the groove 139, the port 137, the space around the valve stem 125 leading to the space between the valve seat 121 and the valve head 123, and thence out through the vent holes 143 and 145. When the valve is in its active position (Fig. 7), communication is established from the space 111 through the space around the valve stem 125 to the port 137 and thence on out through the outlet port 141. At this time, the right-hand end of the bore 113 is blocked by the right-hand valve head 131. Consequently, the vent holes 143 and 145 are blocked.

The right-hand block 29 as illustrated in Figs. 1 and 2 has an integral bracket 149 on which is a cylinder block 151 outward of the respective cam 35. This cylinder block 151 has a cylinder 153 therein, corresponding to the cylinder 93, having an inlet port 155 corresponding to the inlet port 97. The cylinder 153 has a head 101, a piston 103, and a spring 107 exactly like the cylinder 93, and the stop 85 for the right-hand cam. All these elements function in exactly the same manner as those on the left-hand side. The difference is that the cam 35 on the right-hand side is not employed to operate any air valve, as is the cam on the left-hand side, only one air valve being needed. The cam 35 on the right-hand side is a duplicate of the cam 35 on the left-hand side for economy in manufacture, but the rise 83 of the cam on the right-hand side is not used.

Mounted on the top of the plate 17 is a lubricant injector for delivering charges of lubricant to the respective lubricant-delivery couplers 39. As shown, this injector comprises a cylinder block 157 having two horizontal cylindrical openings 159 (Figs. 4 and 5) extending side-by-side from one end of the block to the other. A cylinder 161 is fixed in each opening 159 by a pin 163. Each cylinder has radial inlet ports 165 leading from an annular peripheral groove 167. The block 157 has a lubricant inlet port 169 with separate passages 171 to the grooves 167 (Fig. 4). A plunger 173 is slidable in each cylinder for forcing lubricant which has entered the cylinder through ports 165 out through an outlet check valve 175 at the outlet end of the cylinder. The outlets of the cylinders are connected by flexible hose lines 177 to the ends of the extensions 47 of the lubricant delivery couplers 39.

The plungers extend from the cylinders 161 into an air cylinder 179 extending rearward from the block 157. A piston 181 is slidable in the air cylinder. The rearward ends of the plungers are fixed at 183 to a member 185 threaded on a headed stud 187 carried by the piston. The piston and the plungers are biased rearward by a spring 189 toward an air cylinder end head 191. This head has an air inlet port 193. The plungers have a retracted position determined by engagement of the head of the stud 187 with the cylinder head 191 (Fig. 5), in which position the working ends of the plungers are rearward of the inlet ports 165. Forward movement of the piston and the plungers is limited by a stop screw 195 threaded in the block 157. By adjusting the position of the stop screw, the stroke of the plungers may be varied to vary the charge of the lubricant which is delivered upon each pressure stroke of the plunger.

The lubricant inlet port 169 in the block 157 is connected by a line 197 to a source of supply of lubricant under pressure (not shown). An air hose 199 connects the valve outlet 141 and the air inlet port 193. Whenever the valve member 123 is in its inactive position illustrated in Fig. 1, air is vented from the air cylinder 179 (Fig. 5) through the port 193, the hose 199, the port 141, the annular groove 139, the port 137, the bore 113 to the right end of the bore, and thence out through the vent holes 143 and 145. Under these circumstances, the spring 189 maintains the piston 181 and the plungers 173 in retracted position. The cylinders 161 are charged with lubricant from the source of supply. When the valve member 123 is moved by the rise 83 on the left-hand cam 35 (Fig. 1) to its active position (Fig. 7), air under pressure is introduced into the air cylinder 179 from the space 111 through the bore 113, the port 137, the groove 139, the port 141, the hose 199, and the air inlet port 193 (Fig. 5). This drives the piston 181 and the plungers 173 to the right as illustrated in Fig. 5, thereby forcing measured charges of lubricant out through the check valves 175, and through the hose lines 177 to the lubricant-delivery couplers 39.

Air is supplied from a suitable source of pressure (not shown) through an air pressure regulator 201 to air supply lines 203 leading to the air inlet ports 97 and 155. An air pressure gauge is indicated at 205.

Operation is as follows:

With air under pressure supplied through lines 203 to cylinders 93 and 153, the stops 85 are held outward in the extended position illustrated in Fig. 1. The torsion springs 87 bias the lubricant-delivery couplers 39 angularly to their initial angular position shown in solid lines in Figs. 1 and 3, this position being determined by engagement of the shoulders 81 on the cams 35 with the ends of the stops 85. When the lubricant-delivery couplers are in their initial angular position, they are extended by the springs 53 to a position of maximum radius from their axes of swing to their discharge ends, in which position their discharge ends are located for engagement by the fittings 15 in the course of the travel of the fittings. When the left-hand cam 35 is in the corresponding initial angular position, the valve member 123 is in its inactive position illustrated in Fig. 1, wherein it blocks the line 199 from the air supply, and vents the air cylinder 179 to atmosphere as previously described. With the air cylinder 179 vented, the plungers 173 of the injector are held back in retracted position by the spring 189 and the cylinders 161 are charged with lubricant.

As shown in Fig. 3, the fittings 15, in the course of their travel in the path determined by the I-beam 5, come into engagement with the discharge ends of the couplers 39 at the initial angular and axially extended position of the plungers, and as the rollers travel forward they swing the couplers 39 forward. As will be apparent from Fig. 3, the lefthand coupler swings clockwise and the right-hand coupler 39 swings counterclockwise against the bias of the respective torsion springs 87. As the couplers are swung forward, they are retracted against the return bias of springs 53, until they reach a position at right angles to the path of travel of the rollers. Then they are extended by the springs 53, and finally the fittings move out of engagement with the discharge ends of the couplers when the latter reach the angular position shown in dotted lines in Fig. 3. Thus, the discharge ends of the couplers engage the fittings as the fittings travel through the straight-line portion of their path from the solid line position to the dotted line position illustrated in Fig. 3. The discharge ends of the couplers are constrained to move through the straight-line portion of the path by the fittings themselves.

As the couplers 39 swing forward from their initial angular positions, the cams 35 are correspondingly rotated. The rise 83 on the left-hand cam comes into engagement with the follower 147 just before (about 5° before) the couplers reach the intermediate position at right angles to the path of travel of the rollers, and this effects movement of the valve member 123 to its active position (Fig. 7). When the valve member 123 is moved to this position, air under pressure is supplied through the valve and line 199 to the air cylinder 179. This drives the piston 181 and the plungers 173 to the right as illustrated in Fig. 5, and forces out charges of lubricant through the lines 177 to the respective couplers 39, which deliver the charges to the fittings. It will be seen that this delivery occurs in response to the forward movement of the couplers when the discharge ends of the plungers are in the greatest pressure engagement with the fittings, so that it is assured that the discharge ends are in sealing engagement with the fittings.

Once the fittings 15 disengage from the couplers as the latter reach the advanced angular position illustrated in dotted lines in Fig. 3, the couplers are released to return to their initial angular positions under the bias of torsion springs 87. Upon this return of the couplers, the valve 123 is returned to its inactive position (Fig. 1) by the spring 135. This vents the air cylinder 179, and the plungers 173 are returned to retracted position by spring 189. Thereupon, the lubricant cylinders 161 are recharged with lubricant, and the apparatus is ready to lubricate the next pair of fittings on the next pair of conveyor rollers.

When the air supply is cut off, and the air pressure in the cylinders 93 and 153 is released, the pistons 103 in these cylinders are retracted by the springs 107. Thereupon, the stops 85 may move inward, and the couplers swing to the inactive position illustrated in dot-dash lines in Fig. 3, out of the range of the fittings 15. This arrangement enables the apparatus to be used at periodic intervals, and to provide for ready inactivation of the lubricant-delivery couplers so that during non-lubricating intervals the endless conveyor may continue in operation without actuating the lubricating apparatus. For example, the apparatus may be operated one hour a week. Operation is started simply by opening the air supply, and stopped by cutting off the air supply. The air supply may be under control of a main valve at floor level, so that it is unnecessary to climb up to the apparatus to start and stop it. The mere act of turning off the air not only discontinues the operation, but also effects the movement of the couplers to their inactive position so that they are moved by the conveyor only when the apparatus is actually in operation during the one hour lubricating period.

Certain details of the apparatus are worthy of mention. For example, the vertical legs 23 of the angle brackets 21 have a series of bolt holes therein for receiving bolts for fastening the brackets to the flanges 19 with the horizontal legs 25 of the brackets at different levels. This allows for a coarse adjustment of the plane of the couplers 39. A fine adjustment may be made by threading the sockets 45 up or down on the threaded sections 37 of the shafts 33 accurately to position the couplers in the plane of rollers 3 in accordance with the distance from the top of the beam 5 to the center of the rollers. In the case of deep I-beams, the brackets may be mounted in inverted position from that shown, i. e. they may be mounted with their vertical legs 23 extending downward and the horizontal legs 25 extending from the bottoms of the vertical legs. The ball check valves 63 at the discharge ends of the couplers act to prevent bleeding through the discharge ends of the couplers such as would otherwise be occasioned by flexing of the lines 177 and also act as safety check valves in case the check valves 175 should for some reason fail to close.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Lubricating apparatus comprising a support, a lubricant-delivery coupler carried by the support for swinging movement on an axis transverse to the coupler, a fluid pressure cylinder on the support, a stop for the coupler slidable in the cylinder and held in an extended position by pressure in the cylinder and being movable away from extended position upon release of pressure in the cylinder, means biasing the coupler to swing toward an initial active position determined by the stop when in extended position, a lubricant injector for delivering lubricant to the coupler, fluid pressure means for actuating the injector, said fluid pressure cylinder and fluid pressure means being connectible in a fluid pressure system, and means controlling the supply of pressure fluid to said injector-actuating fluid pressure means operable in response to swinging of the coupler away from initial position for actuating the injector, said stop remaining in extended position as long as pressure is maintained in the system and being released upon cut-off of pressure to allow the coupler to swing to an inactive position.

2. Lubricating apparatus comprising a support, a shaft journalled in the support, a sleeve at one end of the shaft transverse to the axis of the shaft, a lubricant-delivery coupler slidable in the sleeve, means biasing the coupler to an extended position of maximum radius from the axis of the shaft, a fluid pressure cylinder on the support, a stop for the coupler slidable in the cylinder and held in an extended position by pressure in the cylinder and being movable away from extended position upon release of pressure in the cylinder, means biasing the coupler to swing on the shaft axis toward an initial active position determined by the stop when in extended position, a lubricant injector on the support for delivering lubricant to the coupler, fluid pressure means on the support for actuating the injector, said fluid pressure cylinder and fluid pressure means being connectible in a fluid pressure system, and means controlling the supply of pressure fluid to said injector-actuating fluid pressure means operable in response to swinging of the coupler away from initial position for actuating the injector, said stop remaining in extended position as long as pressure is maintained in the system and being released upon cut-off of pressure to allow the coupler to swing to an inactive position.

3. Lubricating apparatus comprising a support, a shaft journalled in the support, a sleeve at one end of the shaft transverse to the axis of the shaft, a lubricant-delivery coupler slidable in the sleeve, means biasing the coupler to an extended position of maximum radius from the axis of the shaft, a fluid pressure cylinder on the support, a stop for the coupler slidable in the cylinder and held in an extended position by pressure in the cylinder and being movable away from extended position upon release of pressure in the cylinder, a cam on the shaft having a shoulder engageable with the stop, means biasing the coupler to swing on the shaft axis toward an initial active position determined by engagement of the cam shoulder with the stop when in extended position, a lubricant injector on the support for delivering lubricant to the coupler, fluid pressure means on the support for actuating the injector, said fluid pressure cylinder and fluid pressure means being connectible in a fluid pressure system, a valve on the support controlling the supply of pressure fluid to said fluid pressure means, the cam being developed to operate the valve in response to swinging of the coupler away from initial position for actuating the injector, said stop remaining in extended position as long as pressure is maintained in the system and being released upon cut-off of pressure to allow the coupler to swing to an inactive position.

VICTOR G. KLEIN.
PAUL WALLS.

References Cited in the file of this patent

UNITED STATES PATENTS

| Number | Name | Date |
|---|---|---|
| 1,160,067 | Goyn | Nov. 9, 1915 |
| 1,416,668 | Abbott | May 23, 1922 |
| 2,030,533 | Pate | Feb. 11, 1936 |

FOREIGN PATENTS

| Number | Country | Date |
|---|---|---|
| 571,844 | Great Britain | Sept. 11, 1945 |